United States Patent [19]

Firey

[11] 4,333,423

[45] Jun. 8, 1982

[54] ENGINE STEAM STRATIFIER

[76] Inventor: Joseph C. Firey, P.O. Box 254 Northgate Sta., Seattle, Wash. 98125

[21] Appl. No.: 148,401

[22] Filed: May 9, 1980

[51] Int. Cl.³ .................. F02B 45/02; F02D 19/04
[52] U.S. Cl. ............................ 123/23; 60/39.46 S
[58] Field of Search .................. 123/23, 24, 25 P; 60/39.46 S, 39.42

[56] References Cited
U.S. PATENT DOCUMENTS
2,625,141  1/1953  Berlyn .................. 123/23
4,059,078  11/1977  Rosa ................... 123/25 P Primary Examiner—Charles J. Myhre
Assistant Examiner—Carl Stuart Miller

[57] ABSTRACT

Engine steam stratifier devices are described capable of supplying and delivering steam largely to those regions of a solid carbon burning internal combustion engine where this solid carbon is being burned and for the principal purpose of reducing the temperatures prevailing in these regions.

18 Claims, 5 Drawing Figures

ENGINE STEAM STRATIFIER

CROSS REFERENCES TO RELATED APPLICATIONS

The invention described herein is intended to be used in combination with the engines described in the following applications of the same inventor:

1. "Char Burning Engine," Ser. No. 06/042,447 now abandoned, filing date May 25, 1979, Group Art Unit 342.
2. "Char and Oil Burning Engine," Ser. No. 06/083,607 now abandoned, filing date Oct. 11, 1979, Group Art Unit 342.
3. "Porous Burner Diesel Engine," Ser. No. 06/138,988 still pending, filing date Apr. 10, 1980, Group Art Unit 342.
4. Improved Char and Oil Burning Engine, Ser. No. 06/183,182 still pending, filing date Sept. 2, 1980, Group Art Unit 342.
5. Char Burning Free Piston Gas Generator, Ser. No. 06/264,105 still pending, filing date May 14, 1981, Group Art Unit 173.

The invention is also technically related to the invention by the same inventor described in the application entitled, "Cyclic Char Gasifier," Ser. No. 06/121,973 now abandoned, filing date Feb. 15, 1980, Group Art Unit 173.

BACKGROUND OF THE INVENTION

1. Field of the Invention

This invention is in the field of internal combustion engines and particularly the field of internal combustion engines capable of running efficiently on char fuels or on high viscosity residual liquid fuels alone or in combination.

2. Description of the Prior Art

Many of the appropriate features of the Prior Art are described in the "Description of the Prior Art" portions of the cross referenced related applications and this material is incorporated herein by reference thereto.

The term engine cylinder is used herein and in the claims to include also the cylinder head if used. The term piston crown is used herein and in the claims to mean that piston surface facing the combustion chamber space. The term combustion chamber space is used herein and in the claims to mean that space fully enclosed by the engine cylinder and the piston crown when said space is of minimum volume during the compression process, which is commonly at the piston top dead center position of compression.

When steam is admitted along with the air during the intake process of an internal combustion engine less air enters the engine per cycle due to displacement by the steam. This reduction of engine air volumetric efficiency reduces engine torque capability.

As discussed in the paper, "Studies Of The Effects Of Water On Gasoline Engine Wear At Low Temperature," Wear, Vol. 10, 1967, pgs 33-48, increasing the steam content of the expansion gases of an internal combustion engine can increase engine corrosive wear or depletion of basic lubricating oil additives.

Excess unreacted steam also acts to reduce engine efficiency by increasing the exhaust gas enthalpy losses.

Hence where steam is desired to be used in an internal combustion engine we prefer to use the least possible amount of steam for reasons of engine efficiency and engine wear, and we also prefer not to admit such steam during the engine intake process.

SUMMARY OF THE INVENTION

The engine steam stratifiers described herein are used in combination with a solid carbon burning internal combustion engine, and comprise a means for supplying steam and a means for delivering this steam at that time in each engine cycle and at that position in each engine cylinder which will place the steam largely adjacent to solid carbon when it is burning in compressed air. Other elements may also be used such as means for controlling the ratio of steam to air delivered to the solid carbon so that temperatures are kept adequately low but not so low that the solid carbon ceases to burn. By thusly stratifying the steam within the engine cylinder so that it is largely placed in the engine cylinder only where and when needed the quantity of excess unreacted steam is minimized and in this way engine wear is reduced and engine efficiency is improved. By preferably delivering steam only during the compression process, immediately preceding combustion of the solid carbon, engine torque capability is not reduced when steam is used since air volumetric efficiency is maintained.

BRIEF DESCRIPTION OF THE DRAWINGS

One example type of steam supply boiler is shown in FIG. 1 comprising a feedwater pump, 1, an evaporator, 2, and a superheater, 3, these latter located in an engine exhaust pipe, 5.

Figure 3:
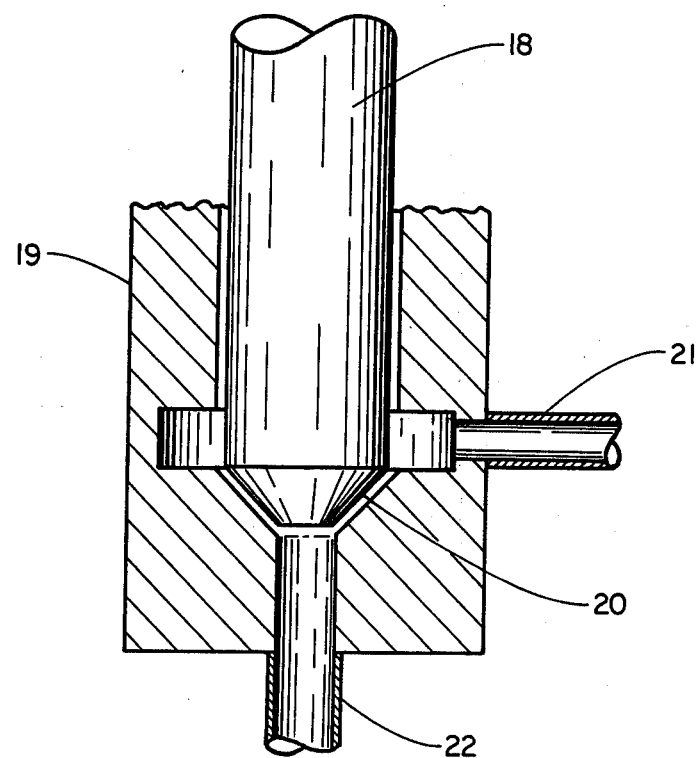

Portions of an admission valve steam delivery means are shown in FIG. 3, which admits steam from a supply connection, 21, via the valve stem, 18, and seat, 20, to an engine cylinder connection, 22.

Figure 4:
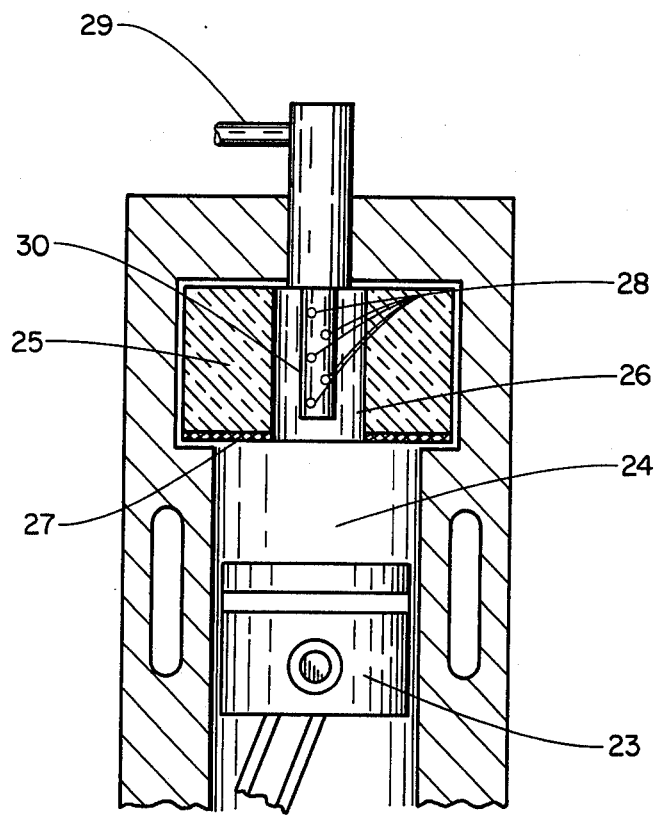

Other portions of a steam delivery means, 30, are shown in FIG. 4, as installed on a porous burner diesel type of solid carbon during internal combustion engine.

Figure 5:
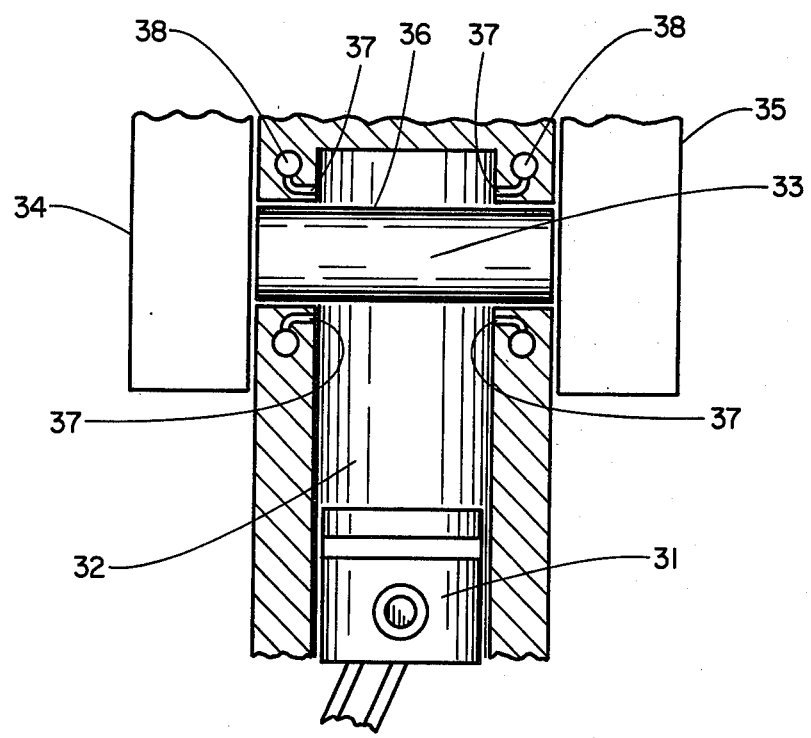

Some portions, 37, 38, of a steam delivery means are shown in FIG. 5, as installed on a char burning engine.

DESCRIPTION OF THE PREFERRED EMBODIMENTS

Hereinafter and in the claims the term solid carbon burning internal combustion engine is used to mean any internal combustion engine which burns solid carbon as all or a significant portion of the engine fuel. The char burning engine, the char and oil burning engine and the porous burner diesel engine of the cross referenced related applications are examples of solid carbon burning internal combustion engines. The solid carbon may enter the engine as such or may be formed during engine combustion from portions of an originally liquid or gaseous fuel.

When a porous solid carbon fuel is burned with air alone in an internal combustion engine very high gas and solid carbon temperatures result and these temperatures are hereinafter and in the claims referred to as pore temperatures. Potentially these pore temperatures can exceed the melting temperature of many ceramic materials and other high temperature materials otherwise suitable for use as engine combustion chamber parts. When, however, a porous solid carbon fuel is burned with air and steam together in an internal combustion engine these pore temperatures are reduced since the steam and carbon reaction is endothermic. The greater the mol ratio of steam to oxygen, ap, within the pores the lower becomes the pore temperature. At a pore steam oxygen ratio of about 1.7 the net heat of reaction approaches zero and the resultant chilling of the solid carbon will prevent further carbon burning and thus the maximum useable value of ap is below 1.7. The minimum value of ap is determined by the operating temperature capabilities of the high temperature materials used for the engine combustion chamber and could be zero with suitable materials or sufficiently low engine compression ratios.

When steam is thusly used to reduce solid carbon pore temperatures to acceptable values we prefer the steam to be largely present only where carbon is present and when this carbon is burning so that excess, unreacted steam can be minimized thus minimizing engine wear and efficiency losses as described hereinabove.

The engine steam stratifier devices of this invention are used, in combination with a solid carbon burning internal combustion engine, to place a major portion of steam used inside the pore spaces containing solid carbon and only during combustion and in this way achieve the beneficial object of reducing engine wear and efficiency losses when steam is used to reduce pore temperatures. An engine steam stratifier admits steam to each engine cylinder at that time in the engine cycle and at that position in the engine cylinder which puts this admitted steam largely into that air mass which is forced inside the pore spaces of the combustion chamber during the compression process. In this way excess unreacted steam is minimized. An engine steam stratifier device comprises a means for supplying steam and a means for properly delivering the steam into each engine cylinder. Various kinds of supply means and delivery means can be used, and additional elements may also be used, such as a scheme to control steam air ratios. Often a single engine steam stratifier device will suffice for a single solid carbon burning internal combustion engine. Two or more engine steam stratifier devices may be used on a single solid carbon burning internal combustion engine in some applications, as for example in engines using two or more separated porous volumes inside their combustion chambers.

Figure 1:
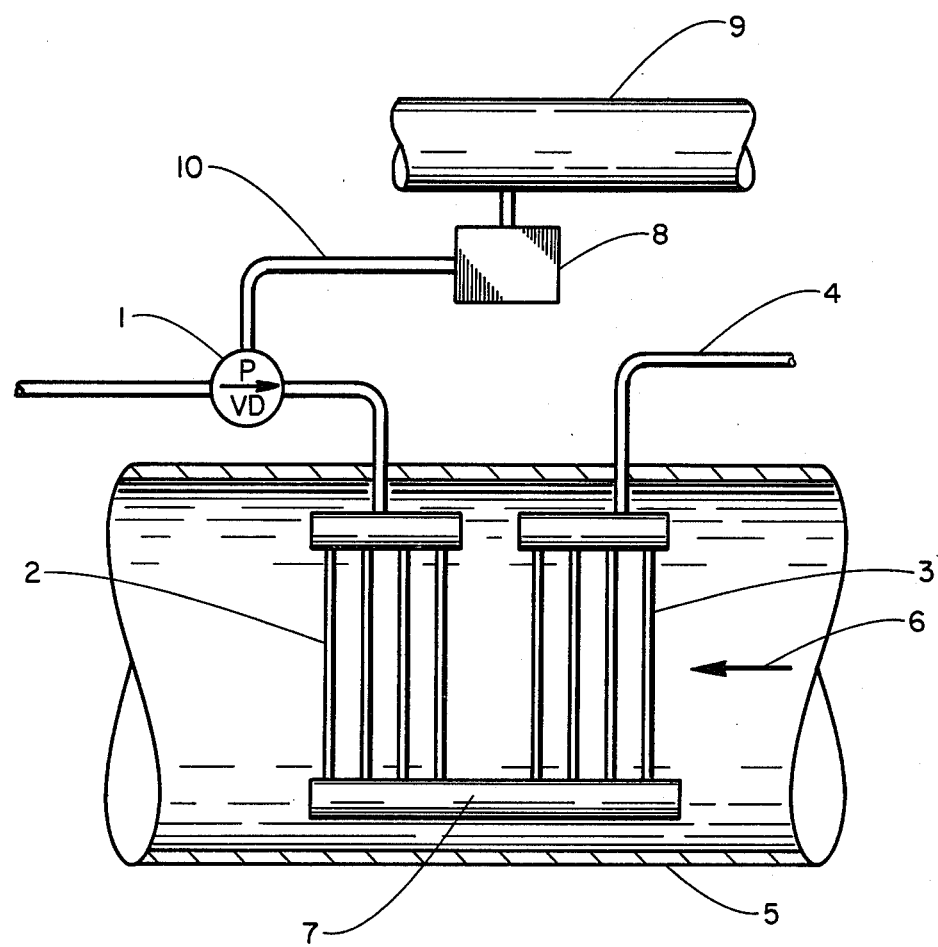

Any of various kinds of steam boilers can be used as a means for supplying steam, such as, an external boiler, a separately fired boiler fired with engine or other fuel, an engine exhaust gas fired boiler. The engine exhaust gas fired boiler will often be preferred as more economical. One particular example of an engine exhaust gas fired boiler suitable for use as a steam supply means is shown in FIG. 1 and comprises, an adjustable flow feedwater pump, 1, an evaporator section, 2, a superheater section, 3, a steam delivery pipe, 4, with the evaporator, 2, and superheater, 3, located inside an engine exhaust pipe, 5, with the exhaust pipe preferably flowing in the direction shown by the arrow, 6. In operation water is pumped by the feedwater pump, 1, into the evaporator, 2, where the water is evaporated into steam and this steam passes via the scale oscillator, 7, into the superheater, 3, where the steam is superheated before flowing via the delivery pipe, 4, to the steam delivery means. The particular example exhaust gas fired boiler shown in FIG. 1 can be a once through boiler without appreciable steam or water storage so that the steam delivery rate at exit, 4, very quickly changes to equal feedwater pumping rate. An engine intake air flow quantity sensor, 8, connecting to the engine intake, 9, can function to adjust the feedwater pump flow quantity via the connection, 10, so that the mass ratio of steam delivered by the boiler to air taken into the engine can be controlled to a desired value.

Any of several kinds of steam delivery means can be used to deliver the steam equally to each engine cylinder at that time in the engine cycle and at that position in the engine cylinder which will place the steam largely into that air mass which goes into those pore spaces of the engine combustion chamber containing solid carbon.

Figure 2:
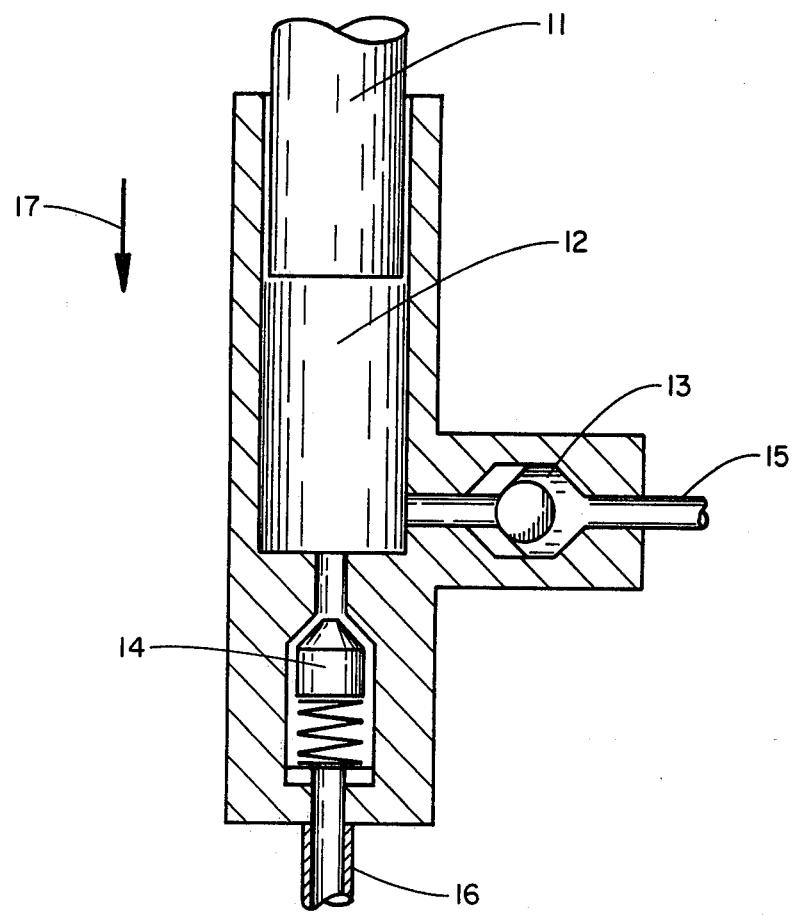
In FIG. 2 is shown a portion of a volume controlled steam delivery means for delivering steam from a supply connection, 15, to the engine cylinder connection, 16.

A portion of one particular example of a volume controlled delivery means is shown in FIG. 2 and comprises a piston, 11, operating inside a cylinder, 12, fitted with a suction check valve, 13, and a delivery check valve, 14. Steam is supplied via the connection, 15, to the suction valve, 13, and is delivered via the spring loaded delivery valve, 14, and the connection, 16, to the engine cylinder. At that time in the engine cycle when steam is to be delivered into the engine cylinder the piston, 11, is driven downward in the direction shown by the arrow, 17, thus closing the suction check valve, 13, opening the delivery check valve, 14, and delivering to that engine cylinder a quantity of steam proportional to the displacement volume of the piston, 11, in the cylinder, 12. Steam delivery stops when this downward motion of the piston, 11, stops, the spring force on the delivery valve, 14, being made sufficient to close this valve against the prevailing steam pressure. Following steam delivery the piston, 11, is withdrawn oppositely to the direction of the arrow, 17, thus opening the suction check valve, 13, and refilling the cylinder, 12, with steam from the steam supply means via the connection, 15. The means for thusly driving the piston, 11, is not shown in FIG. 2 and can be any of the several piston drive means already known in the prior art such as cams and links driven from the engine crankshaft, or hydraulic pumps and valves driven from the engine crankshaft. The mass of steam thusly delivered into each engine cycle is proportional to the displacement volume of the piston, 11, in the cylinder, 12, and the density of the steam refilled into the cylinder, 12, from the steam supply means via the connection, 15. Where this steam displacement volume is fixed the steam mass delivered per engine cycle can be controlled by control of the pressure, and hence density, of the steam supplied, and this control scheme may be preferred where steam supply pressure can be readily adjusted as for example where an external boiler is used whose pressure is well above that needed for the engine use. Alternatively the steam mass delivered per engine cycle can be controlled by ajusting the length of stroke, and hence the steam displacement volume, of the piston, 11, in the cylinder, 12, and this control scheme may be preferred where steam supply pressure is fixed as where a separately fired boiler is used as a steam supply means. Variable stroke length drive means suitable for thusly driving the piston, 11, in the cylinder, 12, are already well known in the prior art of drive means. Combination controls using both adjustable displacement and adjustable steam density can also be used.

A portion of another particularly example of an admission valve delivery means is shown in FIG. 3 and comprises a valve stem, 18, operating within a valve body, 19, and opening from or closing upon a valve seat, 20, a steam inlet connection, 21, from a steam supply means and a steam delivery connection, 22, to an engine cylinder. At that time in the engine cycle when steam is to be delivered into the engine cylinder the valve stem, 18, is lifted off the valve seat, 20, and steam flows from the inlet, 21, via the delivery connection, 22, into the engine cylinder. Steam delivery is stopped when the valve stem, 18, is returned against the valve seat, 20. The means for thusly actuating the valve stem, 18, is not shown in FIG. 3 and can be any of the several valve actuation means known in the prior art such as cams and links driven from the engine crankshaft, or hydraulic pumps and valves driven from the engine crankshaft. The steam supplied at the inlet, 21, needs to be at a pressure greater than the gas pressures prevailing inside the engine cylinder during steam delivery so that steam will indeed flow into the engine cylinder as desired. This admission valve delivery means, shown partially in FIG. 3, is particularly well suited for use with the steam supply means shown in FIG. 1, wherein the steam supply pressure will necessarily rise to that value required for cylinder delivery so long as adequate heat transfer occurs from engine exhaust gas into the water and steam inside the evaporator, 2, and superheater, 3. Adequate heat transfer can be secured by providing sufficient heat transfer area for the evaporator, 2, and superheater, 3, as is known in the art of boiler design.

We seek to so time and position the delivery of steam into the engine cylinder that most of this steam will go into the pore spaces of the engine combustion chamber where and when the burning of solid carbon occurs. In this way the excess, unreacted steam can be minimized as desired. In principle this desired result can be achieved with delivery occurring at any time during the intake and compression process and with delivery positions all the way from the engine intake manifold, to inside the cylinder and to adjacent the pore spaces. In practice for each position of delivery there will be a particular timing and duration of delivery which gives the best result available, as shown by lowest pore temperatures, and some excess unreacted steam will inevitably be used. Similarly differing results will obtain at different delivery positions. The best delivery position and the best timing and duration of delivery at this position can only be determined experimentally for each engine design. Furthermore in some engine designs the best timing and duration will change as engine operating conditions of speed and torque change.

In most engine applications we will prefer to deliver the steam inside the engine cylinder and after the compression process has started so as to maximize intake air flow into the engine cylinder during each cycle as explained hereinabove.

For engines operated at steady speed and torque, as for water or gas pumping service, the best steam delivery timing and duration can be determined experimentally and thereafter can remain fixed at this best setting. Where engine speed is constant but torque varies, as for electric generating service, the best steam delivery timing and duration can be determined experimentally over the torque range. Delivery timing and duration can then be set to best values by hand or automatically as torque varies using adjustable timing mechanisms or devices of the prior art.

For engines operated over a wide range of speeds and torques, as in truck and bus service, it is possible to determine experimentally the best timing and duration for each speed and torque setting and then to automatically adjust steam delivery timing and duration to best values in response to each speed-torque combination using adjustable timing mechanisms or devices already known in the prior art. Alternatively, and preferably in many cases as mechanically simpler, we can position steam delivery adjacent to the flow surface area of the pore spaces and time the steam delivery to coincide with the transfer of air from the clear cylinder spaces into the pore spaces. For this latter scheme, the timing and duration of this air transfer process, being dependent largely on piston position in the cylinder, changes very little with changes of engine speed or torque and hence a fixed timing and duration of steam delivery can be used since the steam is positioned so that it can enter the pores at the same time the air is being transferred therein. The term flow surface area of the pore spaces is used herein and in the claims to mean those external surface areas of the porous spaces within the engine combustion chamber through which air flows into the pore spaces during compression. For this particular fixed timing scheme steam delivery is positioned to occur onto these flow surface areas of the pore spaces, and preferably largely onto those flow surface areas which direct air and steam flow into pore spaces containing solid carbon. Air transfer into the pore spaces occurs, of course, throughout the compression process but the maximum quantity of air transfer occurs during about the last 40 crankshaft degrees of the compression process and then at an approximately constant mass rate. Hence steam delivery can be timed to occur throughout the compression process but with steam flow rate approximately proportional to air transfer rate into the pore spaces. Steam flow rate during delivery can be thusly varied by variation of steam volume displacement rate, as for the FIG. 2 form of delivery means, or by variation of steam admission area, as for the FIG. 3 form of delivery means. These variations of volume displacement rate or admission area can be achieved by suitable design of the drive or actuation means using prior art methods. Alternatively and more simply steam delivery can be timed to occur only during that last part of the compression process when the major portion of air transfer occurs and at an approximately constant rate since air transfer rate is then also roughly constant.

One example arrangement of this fixed steam delivery timing scheme is shown partially in FIG. 4 as applied to a porous burner diesel engine. Only the piston, 23, cylinder, 24, and porous burner volume, 25, portions of the engine are shown in FIG. 4, and only the internal cylindrical surface area, 26, of the porous burner volume, 25, is flow surface area, the other external areas, 27, being sealed against gas flow. Steam is delivered to the flow surface area, 26, via the delivery nozzles, 28, adjacent thereto and these nozzles can direct the steam flow radially onto the flow surface area or preferably partially radially and partially tangentially onto the flow surface area, 26. Steam is delivered to the nozzles, 28, via the connection, 29. The nozzle holder, 30, is preferably retracted, following steam delivery since gas temperatures in that region will rise rapidly once expansion commences.

Another example arrangement of this fixed steam delivery timing scheme is shown partially in FIG. 5 as applied to a char burning engine. Only the piston, 31, cylinder, 32, combustion chamber, 33, refuel block, 34, and ash removal block, 35, portions of the char burning engine are shown in FIG. 5, and the external surface area, 36, of the combustion chamber, 33, is flow surface area. Steam is delivered to the flow surface area, 36, via several delivery nozzles, 37, positioned all around the flow surface area and these nozzles direct the steam flow tangentially onto the flow surface area, 36. Steam is delivered to the nozzles, 37, via the channels, 38.

The refuel block, 34, of the engine of FIG. 5 and the fuel pouring nozzle of the FIG. 4 form of porous burner diesel engine are examples of means for placing a portion of solid carbon fuel within the engine combustion chamber. In these types of solid carbon burning internal combustion engine, the solid carbon thusly placed within the combustion chamber remains therein during several engine cycles and thus occupies, together with the pore spaces within the solid carbon, a fractional portion of the combustion chamber space. The porous burner volume, 25, of the FIG. 4 form of solid carbon burning engine and the walls of the combustion chamber, 33, of the FIG. 5 form of solid carbon burning engine comprise solid pieces of non carbon material which are stationary within the engine cylinder and these pieces, together with any non carbon pore spaces therein, occupy another fractional portion of the combustion chamber space. The remaining portion of the combustion chamber space is a clear space not occupied by either carbon or carbon pore spaces or solid pieces or non carbon pore spaces.

For a particular allowable pore temperature we need to use a particular steam to oxygen ratio, ap, in the gases going into the pore spaces. Except where oxygen enrichment or other gas enrichment of air is used, this pore steam to oxygen ratio can be set by setting an overall steam to air ratio. The intake air flow quantity is defined as the mass of air entering the engine cylinder during a single cycle. The steam flow quantity, or water flow quantity, is defined as the mass of steam entering the engine cylinder during a single cycle and can be adjusted and controlled as described hereinabove. Hence the steam to air ratio is the ratio of these two quantities and to set a desired steam to air ratio the air flow quantity must be sensed. Any of the known prior art sensors of air flow quantity can be used for this purpose such as air flowmeters, manifold absolute pressure sensors, manifold air density sensors, etc. The signal from the air flow quantity sensor can then act via a control device to set the desired steam flow quantity. For an engine operating with a steady air flow quantity the steam flow quantity can be hand adjusted.

In some engine applications duel delivery of steam may be preferred wherein one steam portion is delivered into the cylinder during the early or middle part of the compression process and another steam portion is delivered into the engine cylinder during the latter part of the compression process. For example, the steam delivered early could be timed and positioned to enter that air mass first flowing into the pore spaces and the steam delivered late could be timed and positioned to enter that air mass last flowing into the pore spaces. In this way a gradient of steam to air ratio can be created within the pore spaces. Such a steam to air ratio gradient could be beneficially used in various ways as, for example, to offset in whole or part the temperature gradient due to compression and reaction which would otherwise exist within the pore spaces.

Other means for supplying steam and means for delivering steam can also be used and in differing combinations than in the schemes described above which are only particular examples and it is not intended thereby to limit the invention only to these particular examples. For example the volume controlled delivery means of FIG. 2 can be used with the exhaust gas fired boiler of FIG. 1 if desired. Also for example, the admission valve delivery means of FIG. 3 can be used with an external boiler or a separately fired boiler.

Having thus described my invention, what I claim is:

1. The combination of a solid carbon burning internal combustion engine comprising:

at least one cylinder and at least one and at most two pistons with piston crowns operative within each of said cylinders, each of said cylinders comprising a combustion chamber space fully enclosed by a portion of the interior walls of said cylinder and the crowns of said pistons when said pistons are at that position creating the smallest such fully enclosed space during the engine compression process;

means for placing solid carbon fuel and the pore spaces therein within a fractional portion of each of said combustion chamber spaces, said fractional portion exceeding zero and not exceeding one, so that a major portion of said solid carbon remains within said combustion chamber through several engine cycles, each of said cylinders further comprising at least one solid, non carbon piece, said solid piece and any non carbon pore spaces therein being stationary with respect to said cylinders and occupying a fractional portion, which is less than one and exceeds zero, of said combustion chamber space;

each of said combustion chamber spaces being large enough to contain said solid carbon fuel and the pore spaces therein when placed within said combustion chamber, said solid non carbon stationary pieces and the non carbon pore spaces therein, and a clear non pore space free of solid material, said clear space being a fractional portion, which is less than one and may be zero, of said combustion chamber space;

wherein the improvement comprises adding to said solid carbon burning engine at least one engine steam stratifier comprising:

means for supplying steam;

means for delivering said steam equally into each engine cylinder commencing after commencement of the engine intake process, and stopping prior to the end of the engine compression process;

whereby the solid carbon pore temperatures within said combustion chamber can be reduced.

2. The combination of a solid carbon burning internal combustion engine comprising:

at least one cylinder and at least one and at most two pistons with piston crowns operative within each of said cylinders, each of said cylinders comprising a combustion chamber space fully enclosed by a portion of the interior walls of said cylinder and the crowns of said pistons when said pistons are at that position creating the smallest such fully enclosed space during the engine compression process;

means for placing solid carbon fuel and the pore spaces therein within a fractional portion of each of said combustion chamber spaces, said fractional portion exceeding zero and not exceeding one, so that a major portion of said solid carbon remains within said combustion chamber through several engine cycles;

each of said cylinders further comprising at least one solid, non carbon piece, said solid piece and any non carbon pore spaces therein being stationary with respect to said cylinders and occupying a fractional portion, which is less than one and exceeds zero, of said combustion chamber space;

each of said combustion chamber spaces being large enough to contain said solid carbon fuel and the pore spaces therein when placed within said combustion chamber, said solid non carbon stationary pieces and the non carbon pore spaces therein, and a clear non pore space free of solid material, said clear space being a fractional portion, which is less than one and may be zero, of said combustion chamber space;

wherein the improvement comprises adding to said solid carbon burning engine at least one engine steam stratifier comprising:

means for supplying steam comprising means for adjusting the pressure of said steam in proportion to engine intake air flow quantity;

means for delivering said steam equally into each engine cylinder commencing after commencement of the engine compression process, and stopping prior to the end of the engine compression process;

whereby the solid carbon pore temperatures within said combustion chamber can be reduced.

3. The combination of a solid carbon burning internal combustion engine comprising:

at least one cylinder and at least one and at most two pistons with piston crowns operative within each of said cylinders, each of said cylinders comprising a combustion chamber space fully enclosed by a portion of the interior walls of said cylinder and the crowns of said pistons when said pistons are at that position creating the smallest such fully enclosed space during the engine compression process;

means for placing solid carbon fuel and the pore spaces therein within a fractional portion of each of said combustion chamber spaces, said fractional portion exceeding zero and not exceeding one, so that a major portion of said solid carbon remains within said combustion chamber through several engine cycles;

each of said cylinders further comprising at least one solid, non-carbon piece, said solid piece and any non carbon pore spaces therein being stationary with respect to said cylinders and occupying a fractional portion, which is less than one and exceeds zero, of said combustion chamber space;

each of said combustion chamber spaces being large enough to contain said solid carbon fuel and the pore spaces therein when placed within said combustion chamber, said solid non carbon stationary pieces and the non carbon pore spaces therein, and a clear non pore space free of solid material, said clear space being a fractional portion, which is less than one and may be zero, of said combustion chamber space;

wherein the improvement comprises adding to said solid carbon burning engine at least one engine steam stratifier comprising:

means for supplying steam comprising an engine exhaust-gas-fired boiler; means for pumping water into said engine exhaust gas-fired boiler and means for adjusting the flow of said pumped water to be proportional to engine intake air flow quantity;

means for delivering said steam equally into each engine cylinder commencing after commencement of the engine compression process, and stopping prior to the end of the engine compression process;

whereby the solid carbon pore temperatures within said combustion chamber can be reduced.

4. The combination of a solid carbon burning internal combustion engine comprising:

at least one cylinder and at least one and at most two pistons with piston crowns operative within each of said cylinders, each of said cylinders comprising a combustion chamber space fully enclosed by a portion of the interior walls of said cylinder and the crowns of said pistons when said pistons are at that position creating the smallest such fully enclosed space during the engine compression process;

means for placing solid carbon fuel and the pore spaces therein within a fractional portion of each of said combustion chamber spaces, said fractional portion exceeding zero and not exceeding one, so that a major portion of said solid carbon remains within said combustion chamber through several engine cycles;

each of said cylinders further comprising at least one solid, non carbon piece, said solid piece and any non carbon pore spaces therein being stationary with respect to said cylinders and occupying a fractional portion, which is less than one and exceeds zero, of said combustion chamber space;

each of said combustion chamber spaces being large enough to contain said solid carbon fuel and the pore spaces therein when placed within said combustion chamber, said solid non carbon stationary pieces and the non carbon pore spaces therein, and a clear non pore space free of solid material, said clear space being a fractional portion, which is less than one and may be zero, of said combustion chamber space;

wherein the improvement comprises adding to said solid carbon burning engine at least one engine steam stratifier comprising:

means for supplying steam comprising an engine exhaust gas-fired boiler; means for pumping water into said engine exhaust gas-fired boiler and means for adjusting the flow of said pumped water to be proportional to engine intake air flow quantity;

means for delivering said steam equally into each engine cylinder commencing after commencement of the engine compression process, and stopping prior to the end of the engine compression process;

means for timing and positioning said steam delivery so that it occurs largely into that engine intake air mass which goes into the solid carbon pore spaces within the engine combustion chamber space;

whereby the solid carbon pore temperatures within said combustion chamber can be reduced.

5. The combination of a solid carbon burning internal combustion engine comprising:

at least one cylinder and at least one and at most two pistons with piston crowns operative within each of said cylinders, each of said cylinders comprising a combustion chamber space fully enclosed by a portion of the interior walls of said cylinder and the crowns of said pistons when said pistons are at that position creating the smallest such fully enclosed space during the engine compression process;

means for placing solid carbon fuel and the pore spaces therein within a fractional portion of each of said combustion chamber spaces, said fractional portion exceeding zero and not exceeding one, so that a major portion of said solid carbon remains within said combustion chamber through several engine cycles;

each of said cylinders further comprising at least one solid, non carbon piece, said solid piece and any non carbon pore spaces therein being stationary with respect to said cylinders and occupying a fractional portion, which is less than one and exceeds zero, of said combustion chamber space;

each of said combustion chamber spaces being large enough to contain said solid carbon fuel and the pore spaces therein when placed within said combustion chamber, said solid non carbon stationary pieces and the non carbon pore spaces therein, and a clear non pore space free of solid material, said clear space being a fractional portion, which is less than one and may be zero, of said combustion chamber space;

wherein the improvement comprising adding to said solid carbon burning engine at least one engine steam stratifier comprising:

means for supplying steam comprising means for adjusting the pressure of said steam in proportion to engine intake air flow quantity;

means for delivering said steam in equal volume to each engine cylinder commencing after commencement of the engine compression process and stopping prior to the end of the engine compression process;

means for timing and positioning said steam delivery so that it occurs largely into that engine intake air mass which goes into the solid carbon pore spaces within the engine combustion chamber space;

whereby the solid carbon pore temperatures within said combustion chamber can be reduced.

6. The combination of a solid carbon burning internal combustion engine comprising:

at least one cylinder and at least one and at most two pistons with piston crowns operative within each of said cylinders, each of said cylinders comprising a combustion chamber space fully enclosed by a portion of the interior walls of said cylinder and the crowns of said pistons when said pistons are at that position creating the smallest such fully enclosed space during the engine compression process;

means for placing solid carbon fuel and the pore spaces therein within a fractional portion of each of said combustion chamber spaces, said fractional portion exceeding zero and not exceeding one, so that a major portion of said solid carbon remains within said combustion chamber through several engine cycles;

each of said cylinders further comprising at least one solid, non carbon piece, said solid piece and any non carbon pore spaces therein being stationary with respect to said cylinders and occupying a fractional portion, which is less than one and exceeds zero, of said combustion chamber space;

each of said combustion chamber spaces being large enough to contain said solid carbon fuel and the pore spaces therein when placed within said combustion chamber, said solid non carbon stationary pieces and the non carbon pore spaces therein, and a clear non pore space free of solid material, said clear space being a fractional portion, which is less than one and may be zero, of said combustion chamber space;

wherein the improvement comprises adding to said solid carbon burning engine at least one engine steam stratifier comprising:

means for supplying steam at a constant pressure;

means for delivering said steam in equal volume to each engine cylinder commencing after commencement of the engine compression process and stopping prior to the end of the engine compression process;

means for adjusting said volume of delivered steam to be proportional to engine intake air flow quantity;

whereby the solid carbon pore temperatures within said combustion chamber can be reduced.

7. The combination of a solid carbon burning internal combustion engine and at least one engine steam stratifier as described in claim 1, wherein said steam delivery commences after commencement of the engine compression process.

8. The combination of a solid carbon burning internal combustion engine and at least one engine steam stratifier as described in claim 1, and further comprising:

means for timing and positioning said steam delivery so that the steam to air ratio of the gases flowing into the solid carbon pore spaces exceeds the steam to air ratio of the gases in the clear spaces.

9. The combination of a solid carbon burning internal combustion engine and at least one engine steam stratifier as described in claim 2, and further comprising:

means for timing and positioning said steam delivery so that the steam to air ratio of the gases flowing into the solid carbon pore spaces exceeds the steam to air ratio of the gases in the clear spaces.

10. The combination of a solid carbon burning internal combustion engine and at least one engine steam stratifier as described in claim 3, and further comprising:

means for timing and positioning said steam delivery so that the steam to air ratio of the gases flowing into the solid carbon pore spaces exceeds the steam to air ratio of the gases in the clear spaces.

11. The combination of a solid carbon burning internal combustion engine and at least one engine steam stratifier as described in claim 6, and further comprising:

means for timing and positioning said steam delivery so that the steam to air ratio of the gases flowing into the solid carbon pore spaces exceeds the steam to air ratio of the gases in the clear spaces.

12. The combination of a solid carbon burning internal combustion engine and at least one engine steam stratifier as described in claim 7, and further comprising:

means for timing and positioning said steam delivery so that the steam to air ratio of the gases flowing into the solid carbon pore spaces exceeds the steam to air ratio of the gases in the clear spaces.

13. The combination of a solid carbon burning internal combustion engine and at least one engine steam stratifier as described in claim 1, 2, 3, 4, 5, or 6, and further comprising:

means for positioning and timing said steam delivery so that said steam delivery occurs only during the engine compression process, and so that said steam delivery occurs largely to the flow surface area of the solid carbon pore spaces of the engine combustion chamber.

14. The combination of a solid carbon burning internal combustion engine and at least one engine steam stratifier as described in claim 1, 2, 3, 4, 5, or 6, and further comprising:

means for positioning and timing said steam delivery so that said steam delivery occurs only during the engine compression process, and so that said steam delivery occurs largely to the flow surface area of the solid carbon pore spaces of the engine combustion chamber;

means for controlling said steam delivery rate to be approximately proportional to the concurrent air transfer rate into the solid carbon pore spaces.

15. The combination of a solid carbon burning internal combustion engine and at least one engine steam stratifier as described in claim 1, 2, 3, or 4, and further comprising:

means for timing and positioning said steam delivery so that it occurs largely into that engine intake air mass which goes into the solid carbon pore spaces within the engine combustion chamber space.

16. The combination of a solid carbon burning internal combustion engine and at least one engine steam stratifier as described in claim 1, 2, 3, or 4, and further comprising:

means for timing and positioning said steam delivery so that it occurs largely into that engine intake air mass which goes into the solid carbon pore spaces within the engine combustion chamber space;

means for controlling said delivered steam quantity to be approximately proportional to that engine intake air quantity which goes into the solid carbon pore spces.

17. The combination of a solid carbon burning internal combustion engine and at least one engine steam stratifier as described in claim 1, 2, 3, 4, 5, 6, 7, 8, 9, or 10, and further comprising:

means for timing and positioning said steam delivery so that a first steam portion goes largely into that first engine intake air mass which first goes into the solid carbon pore spaces within the engine combustion chamber space, a second steam portion goes largely into that second engine intake air mass which last goes into the solid carbon pore spaces within the engine combustion chamber space.

18. The combination of a solid carbon burning internal combustion engine and at least one engine steam stratifier as described in claim 1, 2, 3, 4, 5, 6, 7, 8, 9, or 10, and further comprising:

means for timing and positioning said steam delivery so that, a first steam portion goes largely into that first engine intake air mass which first goes into the solid carbon pore spaces within the engine combustion chamber space, a second steam portion goes largely into that second engine intake air mass which last goes into the solid carbon pore spaces within the engine combustion chamber space;

means for controlling said first and second delivered steam portions to be approximately proportional to said first air mass and to said second air mass respectively with the steam to air ratio differing between said first air mass and said second air mass.

* * * * *